United States Patent [19]

Engstrom et al.

[11] Patent Number: 4,984,295
[45] Date of Patent: Jan. 8, 1991

[54] PROGRAMMABLE ELECTRONIC DEVICE

[75] Inventors: Scott M. Engstrom, N. Lauderdale; Christopher A. Myers, Palm Bay; Brian K. Terry, Coral Springs, all of Fla.

[73] Assignee: Motorola, Inc., Schaumburg, Ill.

[21] Appl. No.: 483,973

[22] Filed: Feb. 20, 1990

Related U.S. Application Data

[63] Continuation of Ser. No. 1,128, Jan. 7, 1987, abandoned.

[51] Int. Cl.⁵ .......................... H04B 1/16; H04B 1/40
[52] U.S. Cl. ..................................... 455/186; 455/151; 455/89
[58] Field of Search ........................ 455/151, 186, 89; 335/205, 219; 340/825.72; 73/1 G; 368/69; 364/184, 188

[56] References Cited

U.S. PATENT DOCUMENTS

| | | | |
|---|---|---|---|
| 3,506,939 | 4/1970 | Hesser et al. | 335/206 |
| 3,817,021 | 6/1974 | Bergey | 368/69 |
| 4,330,867 | 5/1982 | Fujita | 455/186 |
| 4,414,831 | 11/1983 | Perkut | 70/276 |
| 4,453,148 | 6/1984 | Norakidze et al. | 335/205 |
| 4,476,706 | 10/1984 | Hadden et al. | 73/1 G |
| 4,509,203 | 4/1985 | Yamada | 455/186 |
| 4,525,865 | 6/1985 | Mears | 455/186 |
| 4,525,866 | 6/1985 | Templin | 455/186 |
| 4,529,980 | 7/1985 | Liotine et al. | 455/151 |
| 4,593,414 | 6/1986 | Koyanagi | 455/186 |
| 4,651,282 | 3/1987 | Robinson et al. | 455/186 X |
| 4,651,282 | 3/1987 | Robinson et al. | 455/186 |
| 4,688,261 | 8/1987 | Killoway et al. | 455/151 |
| 4,704,607 | 11/1987 | Teather et al. | 340/825.72 |

Primary Examiner—Douglas W. Olms
Assistant Examiner—Ralph Smith
Attorney, Agent, or Firm—Daniel K. Nichols

[57] ABSTRACT

The programmable electronic device, such as a radio, includes a memory for storing program information. A controller, such as a microprocessor, is connected to the memory for programming and reading the memory. A keypad is provided for data entry and is connected to the microprocessor. A magnetic switch, such as a Hall effect switch, is located within the radio and controls the program enable line of the microprocessor. The Hall effect switch is actuated by an externally supplied magnetic field for enabling programming of the memory of the radio.

11 Claims, 4 Drawing Sheets

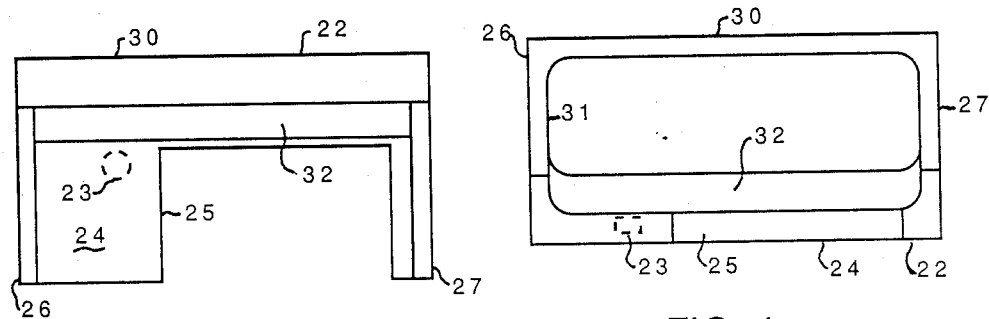
FIG. 3
FIG. 4
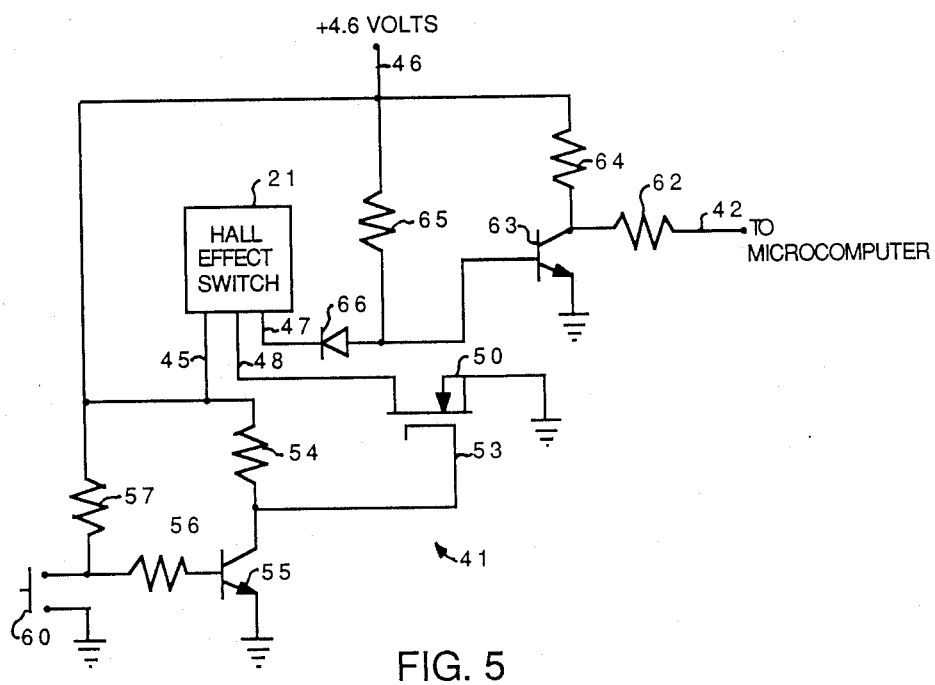
FIG. 5

PROGRAMMABLE ELECTRONIC DEVICE

This is a continuation of application Ser. No. 001,128, filed Jan. 7, 1987, and now abandoned.

BACKGROUND OF THE INVENTION

This invention relates to programmable electronic devices in general and particularly to electronic devices such as radios having keypads which can be used for programming purposes.

Radio designs, as for example, channelized two-way radios, have changed dramatically in recent years with advances in frequency synthesizers, memories, microprocessors and digital control technology. In the past, radio frequencies were typically controlled by crystal channel elements, options and features such as scanning, coded squelch, tone encoders, and the like were typically implemented at the time of manufacture and could only be added to a radio or changed by making internal changes or adding modules. The use of frequency synthesizers permits radios to be programmed for operating frequencies, thereby eliminating the necessity of crystals for every operating frequency. The use of digital control circuits and, particularly, microprocessor based control of radios has provided a great deal of flexibility in radios as to the features and modes of operation. Such features as scanning, as well as coded squelch operation can be easily implemented and changed to suit the user in microprocessor based radios. The use of EEPROM's (Electrically Erasable Programmable Read Only Memories) that can be electrically reprogrammed within the radio now provide a means for non-volatile storage of radio program information. Alternatively, RAM'S (Random Access Memories) either using special memory backup batteries or with memory saving circuitry, that allow for a change of radio batteries without loss of memory, can also be used to maintain radio program information. Radios using such memories can be programmed by external programmers connected to the radio via a programming port. However, greater convenience and flexibility is achieved by use of a keypad on the radio for programming purposes. Such use avoids both the expense and necessity of having a specialized electronic programmer available for programming the radio.

There are, however, drawbacks to the use of keypads for programming purposes. This approach may be undesirable from the standpoint of the possibility of a radio user either unintentionally or without authorization changing the radio programming. For instance, where the user is licensed to operate on certain frequencies, it is desirable to provide means for preventing the user from reprogramming the radio to operate on unauthorized frequencies. Where the radio is provided with memories for generating DTMF (dual-tone multifrequency) signals as for accessing a telephone system, it may be desirable to prevent the user from inadvertently reprogramming the phone number memory. Consequently, while it is desirable to be able to utilize the radio keypad for programming, a method of preventing the user from intentionally or unintentionally altering the programmed information is highly desirable.

SUMMARY OF THE INVENTION

This electronic device which includes a programmable memory for controlling the device and includes means for inhibiting the programming of the device.

The programmable electronic device includes a memory means for storing program information. Control means is operatively connected to the memory means for programming and reading the memory means. Data entry means is connected to the control means for selectively enabling and inhibiting programming of the memory means. The program enable means includes field actuable switching means located within the device which is actuable by an externally supplied field for enabling programming of the device.

In one aspect of the invention, a programming fixture is selectively receivable by the device. The programming fixture includes a magnet providing the externally supplied field. In another aspect of the invention, the field actuable switching means is a Hall effect switch. In still another aspect of the invention, a manually actuable switch is operatively serially connected with the Hall effect switch.

In another aspect of the invention, the control means comprises a microcomputer. The program control line is connected to the microcomputer. In yet another aspect of the invention, a switching transistor switches the control line between high and low for controlling programming of the device. The switching transistor comprises a bipolar transistor, and a series circuit including the Hall effect switch and a tunnel diode controls the switching transistor. The series circuit further includes a field effect transistor and the manually actuable switch controls the field effect transistor.

BRIEF DESCRIPTION OF THE DRAWINGS

FIG. 3 is a rear elevational view of the programming fixture.

FIG. 4 is a bottom plan view of the programming fixture.

FIG. 5 is an electrical schematic diagram of the program enable circuit of the radio of FIG. 1.

DESCRIPTION OF THE PREFERRED EMBODIMENT

Figure 1:
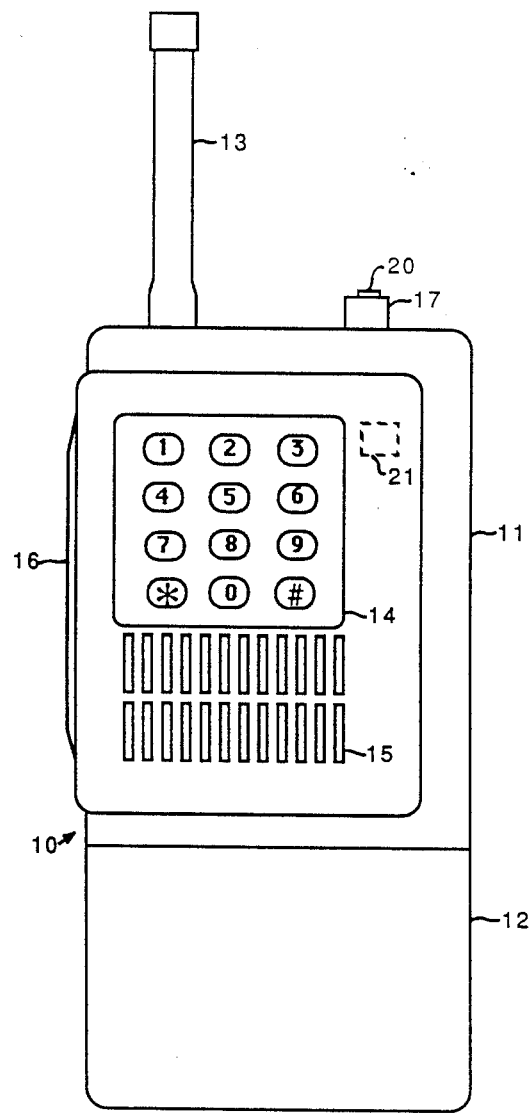
FIG. 1 is a front elevational view of a radio incorporating the present invention.

Referring now by characters of reference to the drawings, and first to FIG. 1, it will be understood that the electronic device, which in this embodiment is a two-way portable radio indicated by 10, includes a housing 11 with an attached battery 12. An antenna 13 is provided for radiating and receiving of signals in a conventional manner. The radio 10 includes a keypad 14, speaker grille 15, and on its side, a push-to-talk (PTT) switch 16. A rotary volume and ON/OFF switch 17 is provided on the top of the radio 10. The rotary switch 17 includes a top button 20 that can be depressed to actuate a momentary contact switch 60 shown in FIG. 5. In the preferred embodiment, the button 20 is used for enabling programming of the radio 10. Located within the radio housing 11, so as not to be apparent to the radio user, is a Hall effect switch 21, constituting field actuable switching means, which is also used for enabling programming of the radio 10. The Hall effect switch 21 provides a magnetic switch operable by a magnetic field.

Figure 2:
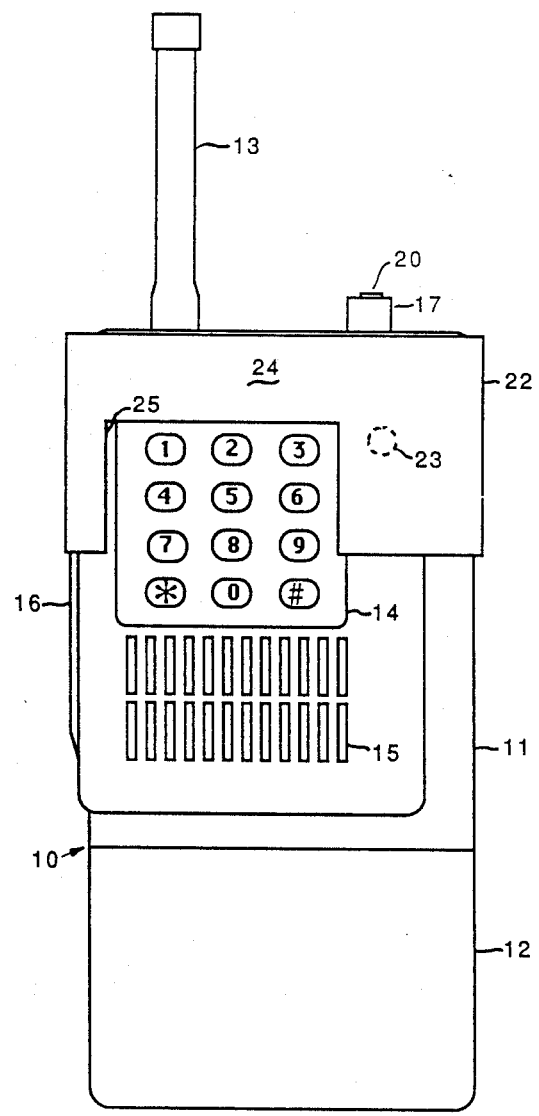
FIG 2 is a front elevational view of the radio of FIG. 1 shown with the programming fixture.

Referring now to FIG. 2, the radio 10 is illustrated with a programming fixture 22 in position. The programming fixture 22 is designed to be received about the radio 10, to position a magnet 23, which is embedded in the fixture 22, in a position adjacent to the Hall effect switch 21, in order to actuate the Hall effect switch for switching purposes. The fixture 22 includes a front wall 24 having a notched portion 25 for providing access to the keypad 14. As shown in FIGS. 3 and 4, opposed side portions 26 and 27 are connected to the front wall 24, while a rear portion 30 interconnects the side portions 26 and 27 to form an opening 31 in which the radio 10 is received. The front wall 24 includes a inner tapered portion 32 that tapers outwardly from the top of the fixture 22 to conform to the radio shape for proper seating of fixture 22 on the particular radio 10.

Figure 6:
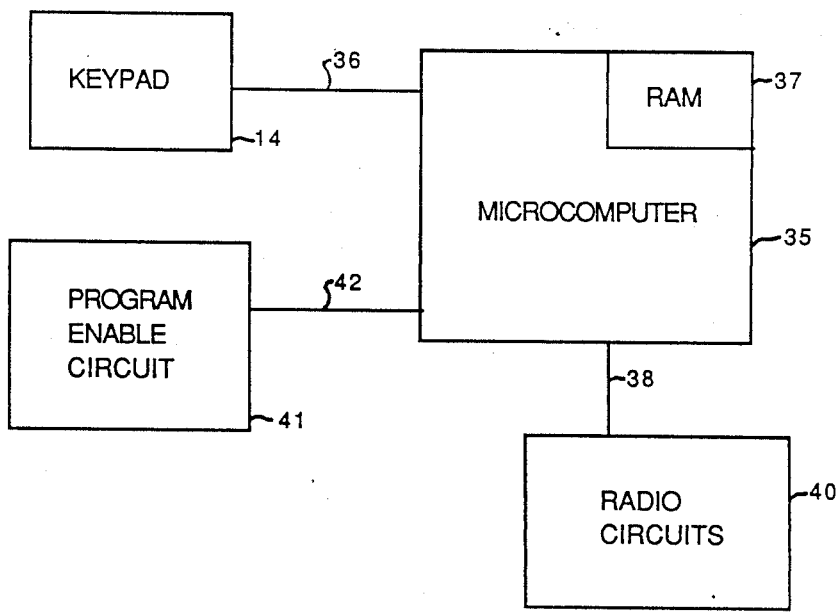
FIG. 6 is a block diagram of the radio of FIG. 1.

As illustrated in FIG. 6, which is a block diagram of the radio 10, the keypad 14 is connected to a microcomputer 35, constituting control means, as by line 36. The actual number of lines required for this connection depends on the number of keys on the keypad 14 and how they are coded. In the preferred embodiment of the invention, the microcomputer 35 includes internal RAM memory 37, constituting memory means, in which radio program information is stored. The microcomputer 35 is connected by appropriate lines designated as 38 to radio circuits 40 in a conventional manner. A program enable circuit 41, constituting programming enable means, is connected to the microcomputer 35 by line 42 for selectively enabling and inhibiting programming of the RAM 37 via the microcomputer.

An electrical schematic diagram of the program enable circuit 41 is shown in FIG. 5. The Hall effect switch 21 includes a bias voltage input 45 that is connected to a voltage source 46 such as the 4.6 volts illustrated. In the preferred embodiment, the Hall effect switch 21 is a UGN-3040U manufactured by Sprague Electric Company of Concord, N.H. The Hall effect switch 21 includes an input 47 and an output 48 which provide normally open switch terminals. The output 48 is connected to the drain of FET (field effect transistor) 50 that has its source connected to ground. The gate 53 of FET 50 is connected to the input 45 by resistor 54. Gate 53 is also connected to the collector of a NPN transistor 55 that has its emitter connected to ground and its base connected to a resistor 56. The voltage source 46 is serially connected by a resistor 57 and resistor 56 to the base of transistor 55. The junction of resistors 56 and 57 is connected to one side of the normally open momentary contact switch 60 that is actuated by the button 20. The other side of switch 60 is connected to ground. The control line 42 is connected via a resistor 62 to the collector of a NPN transistor 63. Its collector is also connected via resistor 64 to voltage source 46 while its emitter is connected to ground. The base of transistor 63 is connected to the anode of a tunnel diode 66 that has its cathode connected to the input 47 of the Hall effect switch 21. A biasing resistor 65 is connected between the anode of diode 66 and the voltage source 46.

While it is thought that the structural features and functional advantages of the programmable radio have become fully apparent from the foregoing description of parts, for completeness of disclosure a brief description of the programming control of the radio will be given.

In order to enable programming of microcomputer 35 a high signal (+voltage) must appear on line 42. When the Hall effect switch 21 and momentary contact switch 60 are open, a low signal appears on line 42. Resistor 65 provides bias voltage to the base of transistor 63 to keep transistor 63 turned on thereby switching line 42 to ground. Transistor 55 is normally on since resistors 57 and 56 supply bias to its base while resistor 54 provides bias voltage to its collector. However, when momentary contact switch 60 is closed, the voltage on the base of transistor 55 goes low turning the transistor off. When transistor 55 is OFF a high voltage, supplied by resistor 54, appears on the gate of FET 50. However, when transistor 55 is ON, the gate of FET 50 is pulled low, thereby turning it OFF.

The Hall effect switch 21 appears as an open switch. However, when programming fixture 22 is properly positioned on radio 10, the magnetic field from magnet 23 actuates the Hall effect switch 21 to effectively connect inputs 47 and 48. When so actuated, the base of transistors 63 is serially connected by the tunnel diode 66 and Hall effect switch 21 to the drain of FET 50. If FET 50 is ON, as when switch 60 is actuated, the base of transistor 63 goes low causing it to switch OFF and a high voltage (4.6 volts) appearing on the collector of transistor 63 is applied to line 42 to provide a program enable signal to microcomputer 35. The tunnel diode 66 is used as it has a sufficiently low forward bias voltage drop to assure that transistor 63 will turn OFF.

The Hall effect switch 21 and momentary contact switch 60 effectively provide two series switches, both of which must be actuated to provide the program enable signal on line 42. The use of two such series switches provides added protection over the single switch, however, if desired the Hall effect switch 21 could be used as the only switch for actuating the microcomputer control line 42 with the appropriate modification of the circuit 41.

While, the magnet of the preferred embodiment is a permanent magnet it will be understood that an electromagnet could also be utilized for the magnet. A simple magnetic switch could be used in place of the Hall effect switch. The Hall effect switch provides an advantage in that it requires the proper magnetic polarity for actuation. Two substantially identical radios could be built requiring opposite magnetic polarity from the programming fixture thereby assuring the programming fixture for one could not be used for programming the other radio.

To enable programming of the radio 10, the programming fixture 22 is positioned on the radio so that magnet 23 can actuate Hall effect switch 21. Button 20 is then depressed to actuate the momentary contact switch 60 and programming of the radio can be accomplished in a conventional manner by actuating the keypad 14. When programming is completed, button 20 is released and the programming fixture 22 is removed. The radio 10 can then be used in a normal fashion. Since programming requires the use of the programming fixture 22, the radio user cannot reprogram the radio intentionally or inadvertantly by actuating only the button 20.

We claim as our invention:

1. A programmable ratio comprising:
   memory means for storing radio program information,
   control means, operatively connected to the memory means, for programming and reading the memory means,
   data entry means connected to the control means, the data entry means including a keypad,
   program enable means connected to the control means, for selectively enabling and inhibiting programming of the memory means, and including field actuable switching means located within the device and actuable by an externally supplied field for enabling programming of the device, and a programming fixture selectively receivable about the radio, the programming fixture including a magnet positioned to provide said externally supplied field for actuating said field actuable switching means.

2. A programmable radio as defined in claim 1, in which:

the field actuable switching means comprises a Hall effect switch.

3. A programmable radio as defined in claim 2, in which:

a manually actuable switch is operatively serially connected with the Hall effect switch.

4. A programmable radio as defined in claim 3, in which the control means comprises a microcomputer.

5. A programmable radio as defined in claim 4, in which the program enable means includes a program control line connected to the microcomputer.

6. A programmable electronic device, comprising:
memory means for storing program information,
control means, operatively connected to the memory means for programming and reading the memory means,
data entry means connected to the control means,
program enable means connected to the control means, for selectively enabling and inhibiting programming of the memory means, and including field actuable switching means located within the device and actuable by an externally supplied field for enabling programming of the device, and
a programming fixture selectively receivable by the device, the programming fixture includes a magnet providing said externally supplied field,
the field actuable switching means comprises a Hall effect switch,
a manually actuable switch is operatively serially connected with the Hall effect switch,
the control means comprising a microcomputer,
the program enable means including a program control line connected to the microcomputer, and
a switching transistor actuated by the manually actuable switch and the Hall effect switch, for switching the control line between high and low for controlling programming of the device.

7. A programmable electronic device as defined in claim 6, in which the switching transistor comprises a bipolar transistor, and a series circuit including the Hall effect switch and a tunnel diode control the switching transistor.

8. The programmable electronic device as defined in claim 7, in which the series circuit further includes a field effect transistor, and the manually actuable switch controls the field effect transistor.

9. A method of programming a radio having a programmable memory comprising:

placing a fixture about the radio, the fixture having a magnet positioned to actuate a magnetic switch within the radio;

manually actuating a switch which cooperates with the magnetic switch to enable programming of the device;

actuating a keypad on the device to program the radio memory;

releasing the manually actuated switch, and removing the programming fixture from the radio to prevent further programming of the radio memory.

10. A method of programming a radio having a programmable memory comprising:

placing a fixture about the radio, the fixture having a magnet positioned to actuate a Hall effect switch within the radio;

manually actuating a second switch which cooperates with the Hall effect switch to enable programming of the radio;

actuating a keypad on the device to program the radio;

releasing the manually actuated switch, and removing the programming fixture from the device to prevent further programming of the radio.

11. A method of programming a memory of a two-way radio comprising:

placing a fixture about the radio, the fixture having a magnet positioned to actuate a magnetic switch within the radio to enable programming of the radio;

actuating a keypad on the memory of the radio to program the radio; and removing the programming fixture from the radio to prevent further programming of the memory of the radio.

* * * * *